(12) United States Patent
Truemper

(10) Patent No.: US 10,843,800 B2
(45) Date of Patent: Nov. 24, 2020

(54) TROLLEY COMPARTMENT AND ON-BOARD KITCHEN

(71) Applicant: Airbus Operations GmbH, Hamburg (DE)

(72) Inventor: Torsten Truemper, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 206 days.

(21) Appl. No.: 15/830,584

(22) Filed: Dec. 4, 2017

(65) Prior Publication Data

US 2018/0086467 A1 Mar. 29, 2018

Related U.S. Application Data

(63) Continuation of application No. PCT/EP2016/062485, filed on Jun. 2, 2016.

(51) Int. Cl.
| | | |
|---|---|---|
| *B64D 11/04* | (2006.01) | |
| *B64D 13/08* | (2006.01) | |
| *B64D 13/06* | (2006.01) | |

(52) U.S. Cl.
CPC ............ *B64D 11/04* (2013.01); *B64D 13/08* (2013.01); *B64D 2013/0629* (2013.01);
(Continued)

(58) Field of Classification Search
CPC .... B64D 11/0007; B64D 11/04; B64D 13/08; B64D 2013/0629
See application file for complete search history.

(56) References Cited

U.S. PATENT DOCUMENTS

| | | |
|---|---|---|
| 4,361,014 A | 11/1982 | Blain |
| 4,969,509 A | 11/1990 | Merensky |
| | (Continued) | |

FOREIGN PATENT DOCUMENTS

| | | |
|---|---|---|
| DE | 3209492 | 10/1982 |
| DE | 3812739 | 7/1989 |
| | (Continued) | |

OTHER PUBLICATIONS

International Search Report, dated Jul. 27, 2016, priority document.
(Continued)

*Primary Examiner* — Nicholas McFall
(74) *Attorney, Agent, or Firm* — Greer, Burns & Crain, Ltd.

(57) ABSTRACT

A trolley compartment for an on-board kitchen intended for installation in a transport vehicle comprises a frontal access aperture as well as a rear wall that lies opposite the access aperture. A worktop forms an upper boundary of the trolley compartment. A first cooling fluid duct, which is connectable to an interior space of the trolley compartment via at least one first cooling fluid aperture, is integrated into or arranged adjacent to the worktop. At least one first removable cooling fluid aperture cover is selectively mountable in the first cooling fluid duct over the first cooling fluid aperture to separate the first cooling fluid duct from the interior space of the trolley compartment, or demountable from the first cooling fluid duct to connect the first cooling fluid duct to the interior space of the trolley compartment via the first cooling fluid aperture.

17 Claims, 4 Drawing Sheets

(52) U.S. Cl.
CPC ..... *B64D 2013/0655* (2013.01); *F25B 2339/047* (2013.01); *F25B 2600/112* (2013.01); *F25B 2600/2511* (2013.01); *F25B 2700/21173* (2013.01); *Y02T 50/44* (2013.01); *Y02T 50/46* (2013.01); *Y02T 50/56* (2013.01)

(56) References Cited

U.S. PATENT DOCUMENTS

| | | |
|---|---|---|
| 5,491,979 A | 2/1996 | Kull et al. |
| 5,513,500 A | 5/1996 | Fischer et al. |
| 7,780,114 B2 | 8/2010 | Doebertin et al. |
| 2005/0061012 A1 | 3/2005 | Zywiak et al. |
| 2007/0119584 A1 | 5/2007 | Scherer et al. |
| 2008/0001031 A1 | 1/2008 | Doebertin et al. |
| 2009/0000329 A1 | 1/2009 | Colberg et al. |
| 2011/0067838 A1 | 3/2011 | Soenmez et al. |
| 2102/0025679 | 2/2012 | Roering |
| 2013/0047657 A1* | 2/2013 | Oswald ............. B64D 11/04 62/407 |
| 2013/0076214 A1 | 3/2013 | Chamberlin et al. |
| 2014/0298824 A1 | 10/2014 | Truemper et al. |
| 2015/0059384 A1 | 3/2015 | Burd et al. |
| 2015/0059385 A1 | 3/2015 | Burd |
| 2015/0089968 A1 | 4/2015 | Lu et al. |
| 2015/0151842 A1 | 6/2015 | Weixler |

FOREIGN PATENT DOCUMENTS

| | | |
|---|---|---|
| DE | 4340317 | 6/1995 |
| DE | 19733934 | 7/1998 |
| DE | 102006023047 | 11/2007 |
| DE | 502004010166 | 8/2008 |
| DE | 102008023636 | 12/2009 |
| DE | 102010031909 | 1/2012 |
| DE | 102013005596 | 10/2014 |
| EP | 1701884 | 9/2006 |
| WO | 2012025200 | 3/2012 |
| WO | 2012040564 | 3/2012 |
| WO | 2013033439 | 3/2013 |
| WO | 2014012746 | 1/2014 |
| WO | 2015003073 | 1/2015 |
| WO | 2015031539 | 3/2015 |
| WO | 2015031658 | 3/2015 |
| WO | 2015050971 | 4/2015 |

OTHER PUBLICATIONS

German Search Report, dated May 13, 2016 priority document 102015210268.8.
German Search Report, dated May 2, 2016 priority document 102015210269.6.
German Search Report, dated May 10, 2016 priority document 102015210271.8.

* cited by examiner

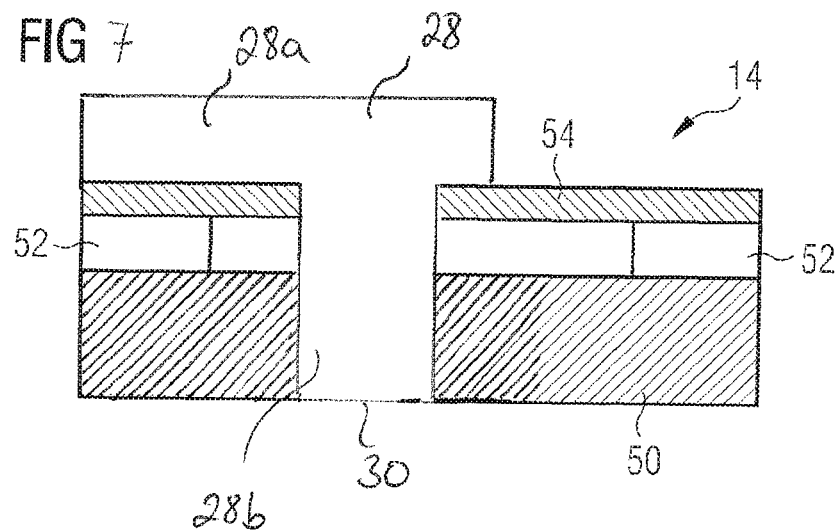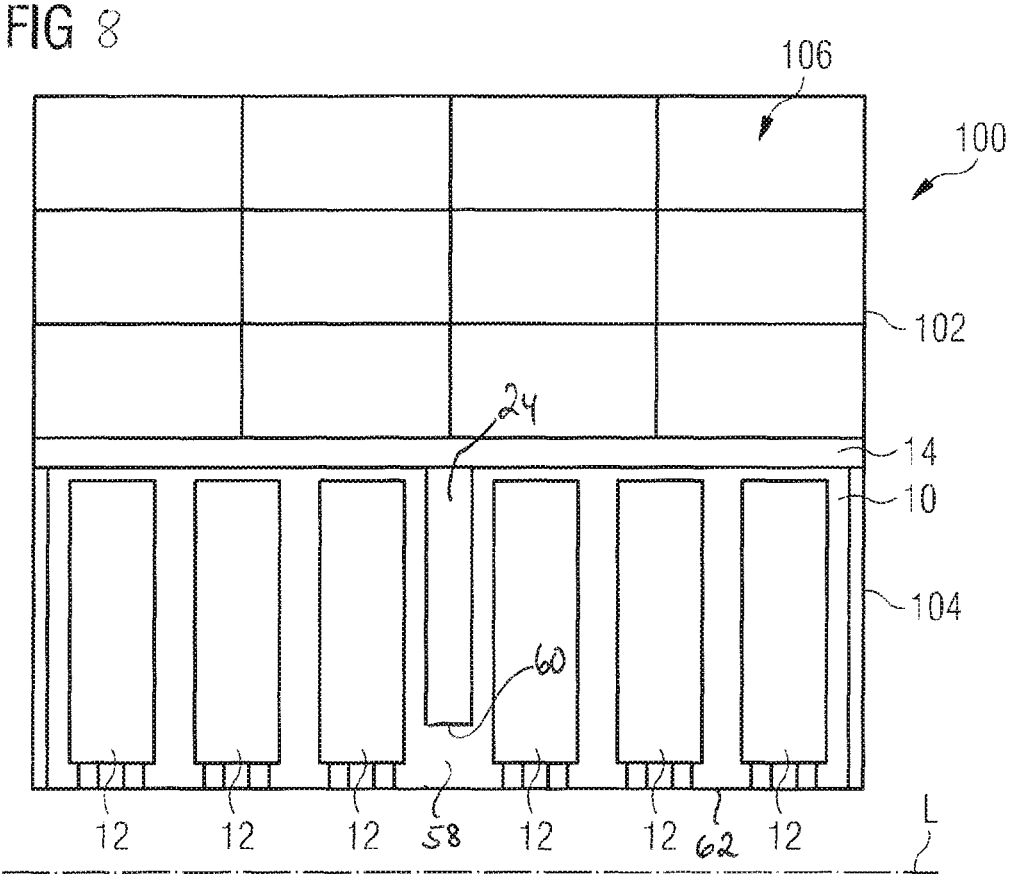

TROLLEY COMPARTMENT AND ON-BOARD KITCHEN

CROSS-REFERENCES TO RELATED APPLICATIONS

This application is a continuation of International Application PCT/EP2016/062485 filed Jun. 2, 2016, designating the United States and published on Dec. 8, 2016 as WO 2016/193366. This application also claims the benefit of the German patent application Nos. 10 2015 210 268.8, 10 2015 210 269.6, and 10 2015 210 271.8 all filed on Jun. 3, 2015. The entire disclosures of the above are incorporated herein by way of reference.

BACKGROUND OF THE INVENTION

The invention relates to a trolley compartment for an on-board kitchen intended for installation in a means of transport, in particular an aircraft. The invention also relates to an on-board kitchen equipped with a trolley compartment of this kind.

Modern commercial aircraft are usually equipped with on-board kitchens, so-called "galleys", which are known, for example, from DE 10 2006 023 047 B4 and U.S. Pat. No. 7,780,114 B2. As a rule, the galleys are installed in the door entry regions of the aircraft cabin and have a corpus with a base structure bounded by a worktop, as well as upper compartments which are arranged above the worktop. Kitchen appliances such as, for example, coffee machines, kettles, cookers, etc., as well as drinks and food are usually accommodated in the upper compartments of the galley. Arranged in the base structure of the galley, on the other hand, is a trolley compartment for receiving movable trolleys which are loaded with items, such as drinks and food, for example, which are intended to be distributed to the passengers on board the aircraft.

On-board kitchens for aircraft may be equipped, as required, with cooled or non-cooled trolley compartments, the design of a galley provided with a cooled trolley compartment differing considerably from the design of a galley with a non-cooled trolley compartment. For example, a galley with a cooled trolley compartment is usually provided with lines for feeding cooling air into the cooled trolley compartment or discharging waste air from the cooled trolley compartment which are laid in the region of a rear wall of the galley corpus, which lines can be dispensed with in the case of a galley with a non-cooled trolley compartment. Moreover, a cooling device, which may be constructed, for example, in the form of an independent air-chiller or connected to a central cooling system of the aircraft, may be installed in a galley with a cooled trolley compartment. On-board kitchens for aircraft that have a cooled trolley compartment therefore usually have a larger floor plan and, in particular, a greater depth than on-board kitchens for aircraft that have a non-cooled trolley compartment.

When constructing a commercial aircraft, it is therefore necessary, even at a very early point in time, to establish whether the galleys installed in the aircraft are to be equipped with cooled or non-cooled trolley compartments. Later changes to this functionality requirement result in expensive adaptations of the entire cabin layout. In most cases, subsequent conversion of a galley with a non-cooled trolley compartment to a galley with a cooled trolley compartment is not possible at all.

SUMMARY OF THE INVENTION

An underlying object of the invention is to indicate a trolley compartment for an on-board kitchen intended for installation in a means of transport, in particular an aircraft, which makes it possible to decide, in a very flexible manner and at any desired point in time, whether the trolley compartment is constructed as a cooled or a non-cooled trolley compartment. The underlying object of the invention is also to make available an on-board kitchen which is equipped with a trolley compartment of this kind.

A trolley compartment for an on-board kitchen intended for installation in a means of transport comprises a frontal access aperture as well as a rear wall that lies opposite the access aperture. At least one movable trolley, which may be loaded, for example, with drinks, food or other items which are intended to be distributed to passengers in the means of transport, can be pushed into, or moved out of, the trolley compartment through the frontal access aperture. The trolley compartment may also have a door for occluding the access aperture and, if desired, may be sealed off from the surrounding atmosphere by means of a sealing system which is described in DE 10 2010 031 909 A1 or WO 2012/025200 A1.

A worktop forms an upper boundary of the trolley compartment. When an on-board kitchen equipped with the trolley compartment is installed in a means of transport, an upper side of the worktop may be used as a working surface. On the other hand, an interior space of the trolley compartment which is intended for receiving at least one movable trolley is bounded in the upward direction by an underside of the worktop. A first cooling fluid duct, which is connectable to the interior space of the trolley compartment via at least one first cooling fluid aperture, is integrated into the worktop or arranged adjacent to the worktop. In case the first cooling fluid duct is arranged adjacent to the worktop, the first cooling fluid duct may be arranged either below a lower surface of the worktop which faces the interior space of the trolley compartment or above an upper surface of the worktop which faces away from the interior space of the trolley compartment. A first cooling fluid duct arranged above an upper surface of the worktop may comprise a first portion extending substantially parallel to the upper surface of the worktop and at least one second portion extending substantially perpendicular to the upper surface of the worktop through the worktop. The at least one second portion of the first cooling fluid duct may connect the first portion of the first cooling fluid duct to the at least one first cooling fluid aperture.

The first cooling fluid duct may be designed either as a cooling fluid feed duct section for feeding cooling fluid into the interior space of the trolley compartment, or as a cooling fluid discharge duct section for discharging cooling fluid, which has been warmed up on flowing through the trolley compartment, from the interior space of the trolley compartment. The cooling fluid which is conducted through the interior space of the trolley compartment is preferably air. Depending upon the size of the trolley compartment, the first cooling fluid duct may be capable of being connected to the interior space of the trolley compartment via a number of first cooling fluid apertures, in which case the first cooling fluid apertures may be arranged in a manner distributed along a longitudinal axis of the trolley compartment that extends parallel to the frontal access aperture and the rear wall of the trolley compartment.

The trolley compartment further comprises at least one removable cooling fluid aperture cover which is selectively mountable in the first cooling fluid duct over the first cooling fluid aperture in order to separate the first cooling fluid duct from the interior space of the trolley compartment, or demountable from the first cooling fluid duct in order to connect the first cooling fluid duct to the interior space of the trolley compartment via the first cooling fluid aperture. If a number of first cooling fluid apertures are provided in the first cooling fluid duct, there is preferably a corresponding number of first removable cooling fluid aperture covers which permit, selectively, sealing-off or unblocking of the first cooling fluid apertures. The first removable cooling fluid aperture cover may be constructed, for example, in the form of a plate made of plastic, metal or the like.

In case of an integration of the first cooling fluid duct into the worktop of the trolley compartment or in case of an arrangement of the first cooling fluid duct above the worktop, no additional installation space for the first cooling fluid duct is required in the trolley compartment. In any case, i.e., also in case of an arrangement of the first cooling fluid duct below the worktop, it is possible to dispense with arranging the first cooling fluid duct in the region of the rear wall of the trolley compartment. A cooled trolley compartment can accordingly be produced which has the same depth, i.e., the same distance between the frontal access aperture and the rear wall, as a non-cooled trolley compartment. When planning the layout of a passenger cabin of the means of transport, it is therefore not necessary to decide, even at a very early point in time, whether an on-board kitchen with a cooled trolley compartment or an on-board kitchen with a non-cooled trolley compartment is to be installed in the passenger cabin. On the contrary, it is possible, when planning the layout of the passenger cabin, to start out from the installation of an on-board kitchen with a trolley compartment having standard dimensions and to decide, only at a later point in time, whether the trolley compartment is to be designed as a cooled trolley compartment or as a non-cooled trolley compartment.

If the decision has been made to construct the trolley compartment as a non-cooled trolley compartment, the first cooling fluid aperture may be occluded by means of the first removable cooling fluid aperture cover, and the first cooling fluid duct may thereby be separated from the interior space of the trolley compartment. The first removable cooling fluid aperture cover then prevents dirt from penetrating into the first cooling fluid duct. If, on the other hand, the trolley compartment is to be designed as a cooled trolley compartment, the installation of the first removable cooling fluid aperture cover in the first cooling fluid duct is dispensed with, or else the first removable cooling fluid aperture cover is demounted from the first cooling fluid duct in order to unblock the first cooling fluid aperture and thus connect the first cooling fluid duct to the interior space of the trolley compartment. Accordingly, the trolley compartment can be flexibly configured, in a very simple manner, as a cooled trolley compartment or as a non-cooled trolley compartment, as required. Moreover, a subsequent conversion of the trolley compartment from a cooled trolley compartment to a non-cooled trolley compartment or vice versa is very easily possible.

In one preferred embodiment, the trolley compartment further comprises a first removable fluid-permeable, grille-type cooling fluid aperture cover which is selectively mountable in the first cooling fluid duct over the first cooling fluid aperture, or demountable from the first cooling fluid duct. The first fluid-permeable, grille-type cooling fluid aperture cover permits the passage of cooling fluid, but holds back dirt. If the trolley compartment is to be constructed as a cooled trolley compartment, and the first removable cooling fluid aperture cover is accordingly dispensed with, the first removable fluid-permeable, grille-type cooling fluid aperture cover is therefore preferably fitted over the first cooling fluid aperture. If a number of first cooling fluid apertures are provided in the first cooling fluid duct, there is preferably a corresponding number of first removable grille-type cooling fluid aperture covers, which permit, selectively, fluid-permeable covering, or else complete unblocking, of the first cooling fluid apertures.

The trolley compartment may also comprise a second cooling fluid duct. The second cooling fluid duct may be connectable to the first cooling fluid duct via a connecting aperture provided in the first cooling fluid duct. Depending upon the configuration of the first cooling fluid duct as a cooling fluid feed duct section or as a cooling fluid discharge duct section, the second cooling fluid duct may also be designed as a cooling fluid feed duct section for feeding cooling fluid into the interior space of the trolley compartment, or as a cooling fluid discharge duct section for discharging cooling fluid, which has been warmed up on flowing through the trolley compartment, from the interior space of the trolley compartment. For example, the first and second cooling fluid ducts may jointly form a cooling fluid discharge duct through which cooling fluid which has been warmed up on flowing through the trolley compartment is discharged from the interior space of the trolley compartment and fed to a cooling fluid inlet of a cooling device. As an alternative to this, however, the first and second cooling fluid ducts may also jointly form a cooling fluid feed duct through which cooling fluid which passes out of a cooling fluid outlet of a cooling device is conducted into the interior space of the trolley compartment.

The second cooling fluid duct is preferably integrated into a sidewall or partition of the trolley compartment. The second cooling fluid duct then requires particularly little additional installation space. As an alternative to this, however, it is also conceivably possible to arrange the second cooling fluid duct adjacently to a sidewall or adjacently to a partition of the trolley compartment. Installation of the second cooling fluid duct in a sidewall or adjacently to a sidewall of the trolley compartment is particularly appropriate if the trolley compartment has fairly small dimensions and is suitable for accommodating only one trolley or a small number of trolleys. On the other hand, installation of the second cooling fluid duct in a partition or adjacently to a partition of the trolley compartment is advantageous if the trolley compartment in question is one which has fairly large dimensions and in which a plurality of trolleys can be accommodated.

The second cooling fluid duct may be formed by a cavity which is present in a partition or a sidewall of the trolley compartment. As an alternative to this, however, the second cooling fluid duct may also be formed by a separately constructed component which optionally may, or may not, be provided in the trolley compartment, that is to say depending upon whether the trolley compartment is to be cooled or not.

A removable connecting aperture cover may be selectively mountable in the first cooling fluid duct over the connecting aperture in order to separate the first cooling fluid duct from the second cooling fluid duct, or demountable from the first cooling fluid duct in order to connect the first cooling fluid duct to the second cooling fluid duct via the connecting aperture. In the case of a non-cooled trolley compartment, the connecting aperture may be occluded by means of the removable connecting aperture cover, and the first cooling fluid duct thereby separated from the second cooling fluid duct. In the case of a cooled trolley compartment, on the other hand, installation of the removable connecting aperture cover in the first cooling fluid duct is dispensed with, or the removable connecting aperture cover is demounted from the first cooling fluid duct in order to unblock the connecting aperture and thus connect the first cooling fluid duct to the second cooling fluid duct of the trolley compartment.

If desired, the trolley compartment may also comprise a removable fluid-permeable, grille-type connecting aperture cover which is selectively mountable in the first cooling fluid duct over the connecting aperture, or demountable from the first cooling fluid duct. In a manner similar to the first fluid-permeable, grille-type cooling fluid aperture cover, the fluid-permeable, grille-type connecting aperture cover also permits the passage of cooling fluid, but holds back dirt particles or the like. If the trolley compartment is to be constructed as a cooled trolley compartment, and the removable connecting aperture cover is accordingly dispensed with, it is therefore possible to fit the removable fluid-permeable, grille-type connecting aperture cover over the connecting aperture.

The trolley compartment preferably further comprises an installation space for a cooling device, which installation space is connected to the second cooling fluid duct. The cooling device may be designed, for example, in the form of an independent air-chiller. As an alternative to this, however, the cooling device may also be connected to a central cooling system of the means of transport and comprise, for example, a heat exchanger through which a cooling fluid flows and within which air is cooled to a desired low temperature before being fed into the trolley compartment. The installation space for a cooling device may be arranged adjacently to a sidewall or a partition of the trolley compartment. Preferably, however, the installation space for a cooling device is integrated, in a particularly space-saving manner, into a side wall or a partition of the trolley compartment. Installation of the installation space for a cooling device in a sidewall or adjacently to a sidewall of the trolley compartment is particularly appropriate if the trolley compartment has fairly small dimensions and is suitable for accommodating only one trolley or a small number of trolleys. On the other hand, installation of the installation space for a cooling device in a partition or adjacently to a partition of the trolley compartment is advantageous if the trolley compartment in question is one which has fairly large dimensions and in which a plurality of trolleys can be accommodated.

In one embodiment of the trolley compartment, the installation space for a cooling device may be so arranged that it permits positioning of the cooling device immediately underneath the worktop. The second cooling fluid duct may then be formed by the connecting aperture or an inner peripheral wall of the connecting aperture constructed in the worktop.

The trolley compartment may also comprise a third cooling fluid duct which is connected to the installation space for a cooling device and which is connectable to the interior space of the trolley compartment via a second cooling fluid aperture. The third cooling fluid duct thus produces, if required, i.e., if the trolley compartment is constructed as a cooled trolley compartment, a direct connection between the installation space for a cooling device and the interior space of the trolley compartment. The third cooling fluid duct may be designed either as a cooling fluid feed duct for feeding cooling fluid into the interior space of the trolley compartment, or as a cooling fluid discharge duct for discharging cooling fluid, which has been warmed up on flowing through the trolley compartment, from the interior space of the trolley compartment.

The third cooling fluid duct may be arranged adjacently to a sidewall or a partition of the trolley compartment. Preferably, however, the third cooling fluid duct is integrated into a side wall or a partition of the trolley compartment. Installation of the third cooling fluid duct in a sidewall or adjacently to a sidewall of the trolley compartment is particularly appropriate if the trolley compartment has fairly small dimensions and is suitable for accommodating only one trolley or a small number of trolleys. On the other hand, installation of the third cooling fluid duct in a partition or adjacently to a partition of the trolley compartment is advantageous if the trolley compartment in question is one which has fairly large dimensions and in which a plurality of trolleys can be accommodated. Particularly if the third cooling fluid duct is installed adjacently to a partition or is integrated into the partition, two second cooling fluid apertures are preferably present, which connect the third cooling fluid duct to two sections of the trolley compartment interior space which are separated from one another by the partition.

The third cooling fluid duct may be formed by a cavity which is present in a partition or a sidewall of the trolley compartment. As an alternative to this, however, the third cooling fluid duct may also be formed by a separately constructed component which optionally may, or may not, be provided in the trolley compartment, that is to say depending upon whether the trolley compartment is to be cooled or not.

A free space may be defined between a lower edge of the partition and a floor of the trolley compartment. Thus, cooling fluid may circulate between the two sections of the trolley compartment interior space which are separated from one another by the partition.

A second removable cooling fluid aperture cover may be selectively mountable in the third cooling fluid duct over the second cooling fluid aperture in order to separate the third cooling fluid duct from the interior space of the trolley compartment, or demountable from the third cooling fluid duct in order to connect the third cooling fluid duct to the interior space of the trolley compartment via the second cooling fluid aperture. In the case of a non-cooled trolley compartment, the second cooling fluid aperture may be occluded by means of the second removable cooling fluid aperture cover, and the third cooling fluid duct thereby separated from the interior space of the trolley compartment. The second removable cooling fluid aperture cover then prevents the penetration of dirt into the third cooling fluid duct. In the case of a cooled trolley compartment, on the other hand, installation of the second removable cooling fluid aperture cover in the third cooling fluid duct is dispensed with, or the second removable cooling fluid aperture cover is demounted from the third cooling fluid duct in order to unblock the second cooling fluid aperture and thus connect the third cooling fluid duct to the interior space of the trolley compartment. If a number of second cooling fluid apertures are provided in the third cooling fluid duct, there is preferably a corresponding number of second removable cooling fluid aperture covers which permit, selectively, sealing-off or unblocking of the second cooling fluid apertures.

The trolley compartment may also comprise a second removable fluid-permeable, grille-type cooling fluid aperture cover which is selectively mountable in the third cooling fluid duct over the second cooling fluid aperture, or demountable from the third cooling fluid duct. In a manner similar to the first fluid-permeable, grille-type cooling fluid aperture cover, the second fluid-permeable, grille-type cooling fluid aperture cover also permits the passage of cooling fluid, but holds back dirt. If the trolley compartment is to be constructed as a cooled trolley compartment, and the second removable cooling fluid aperture cover is accordingly dispensed with, the second removable fluid-permeable, grille-type cooling fluid aperture cover is therefore preferably fitted over the second cooling fluid aperture. If a number of second cooling fluid apertures are provided in the third cooling fluid duct, there is preferably a corresponding number of second removable grille-type cooling fluid aperture covers which permit, selectively, fluid-permeable covering, or complete unblocking, of the second cooling fluid apertures.

The worktop of the trolley compartment may comprise a first layer as well as a second layer which is separated from the first layer by spacers.

The first cooling fluid duct may be integrated into the first layer. A multilayer makeup of this kind for the worktop makes it possible to integrate the first cooling fluid duct into the worktop particularly easily.

A pull-out table may be arranged in a cavity which is formed by the spacers between the first and second layers of the worktop. When the pull-out table is in its pulled-out position, it enlarges the working surface formed by the upper side of the worktop. In its inoperative position, on the other hand, it is integrated into the worktop and requires no additional installation space.

The trolley compartment may be provided with an insulating layer in the region of at least one sidewall and/or its rear wall. If the trolley compartment is constructed as a cooled trolley compartment, the insulating layer prevents too much cooling energy being given off, via the sidewall, the sidewalls and/or the rear wall of the trolley compartment, to the area surrounding the trolley compartment.

An on-board kitchen which is intended for installation in a means of transport comprises a trolley compartment which has been described above.

A trolley compartment which has been described above and/or an on-board kitchen which has been described above is/are particularly advantageously suitable for use in an aircraft.

BRIEF DESCRIPTION OF THE DRAWINGS

A preferred embodiment of the invention will now be explained in greater detail with the aid of the appended diagrammatic drawings, in which:

FIG. 7 shows a detail of a further alternative worktop, in a cross-sectional view; and FIG. 8 shows a diagrammatic general representation of a second embodiment of an on-board kitchen.

DETAILED DESCRIPTION OF THE PREFERRED EMBODIMENTS

Figure 1:
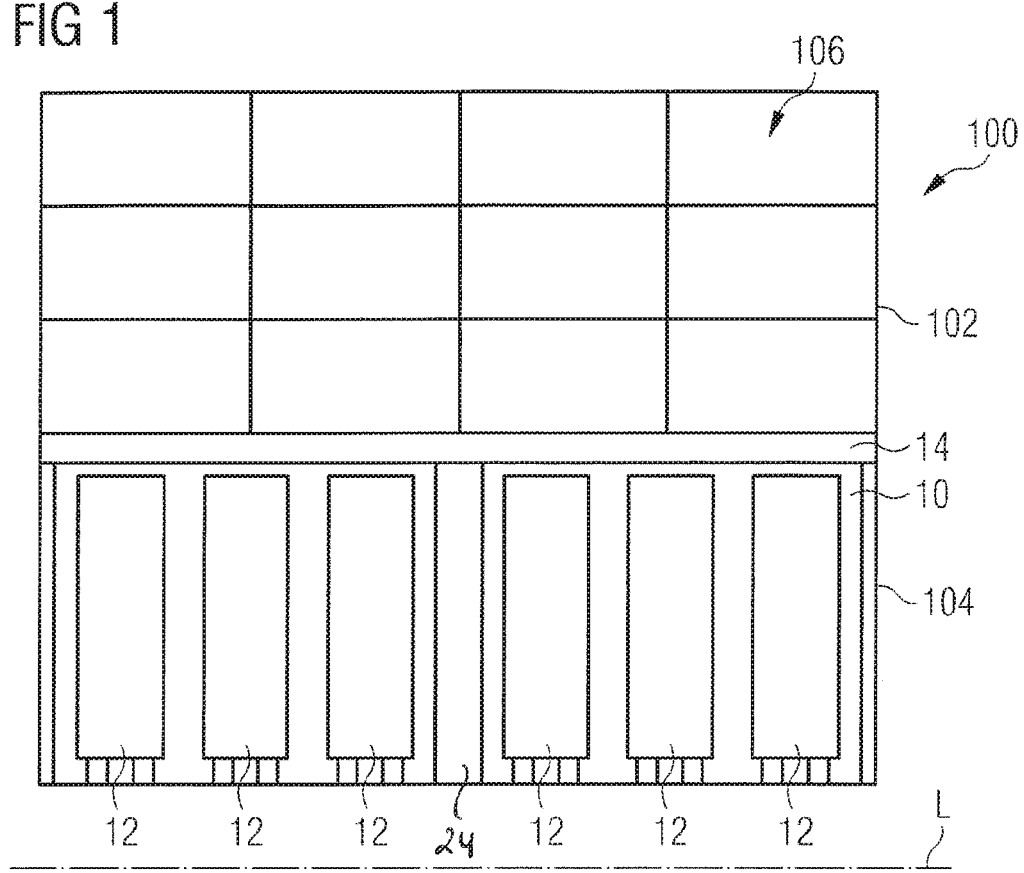
FIG. 1 shows a diagrammatic general representation of a first embodiment of an on-board kitchen.

FIG. 1 shows a first embodiment of an on-board kitchen 100 which is particularly suitable for installation in a passenger cabin of a commercial aircraft. The on-board kitchen 100 comprises a corpus 102 with a base structure 104 as well as upper compartments 106 arranged above the base structure 104. Kitchen appliances such as, for example, coffee machines, kettles, cookers, etc., as well as drinks and food are accommodated in the upper compartments 106. Arranged in the base structure 104 of the on-board kitchen 100, on the other hand, is a trolley compartment 10 for receiving movable trolleys 12 which are loaded with items, such as drinks and food for example, which are intended to be distributed to the passengers in the passenger cabin of the commercial aircraft. The trolley compartment 10 is bounded in the upward direction by a worktop 14, the upper side of which forms a working surface for work to be carried out in the on-board kitchen 100.

Figure 2:
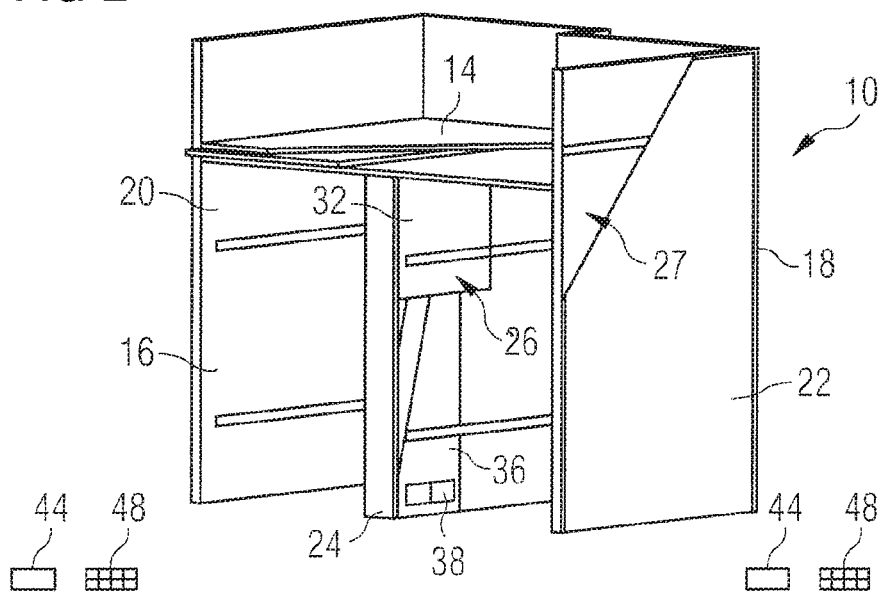
FIG. 2 shows a trolley compartment belonging to the on-board kitchen according to FIG. 1, in a three-dimensional oblique view.
Figure 3:
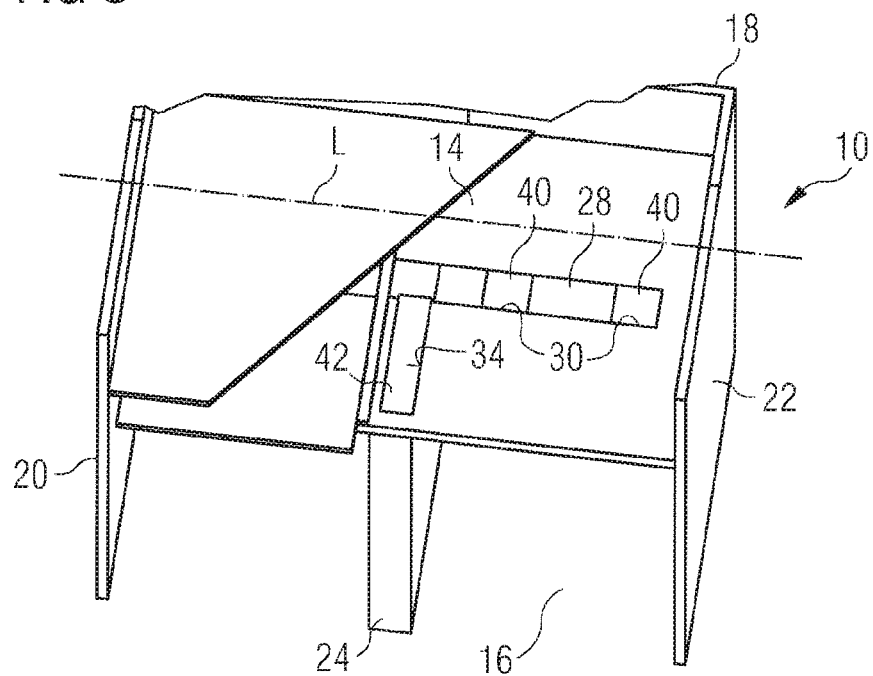
FIG. 3 shows the trolley compartment according to FIG. 2, in a partly cutaway three-dimensional top view.

As can be seen in FIGS. 2 and 3, the trolley compartment 10 comprises a frontal access aperture 16 as well as a rear wall 18 that lies opposite the access aperture 16. The access aperture 16 can be occluded by means of a door, which is not illustrated in the figures. A first and a second sidewall 20, 22 of the trolley compartment 10 extend parallel to one another and substantially perpendicularly to the rear wall 18. A partition 24 subdivides an interior space of the trolley compartment 10 into a first section, which is bounded by the first sidewall 20 and the partition 24, and a second section which is bounded by the partition 24 and the second sidewall 22. Integrated into the partition 24 is an installation space 26 for a cooling device (not shown in the figures). The cooling device which is to be installed in the installation space 26 may be constructed in the form of an independent air-chiller or be intended for connection to a central cooling system of the aircraft. The trolley compartment 10 is provided with an insulating layer 27 in the region of its sidewalls 20, 22 and its rear wall 18.

Figure 4:
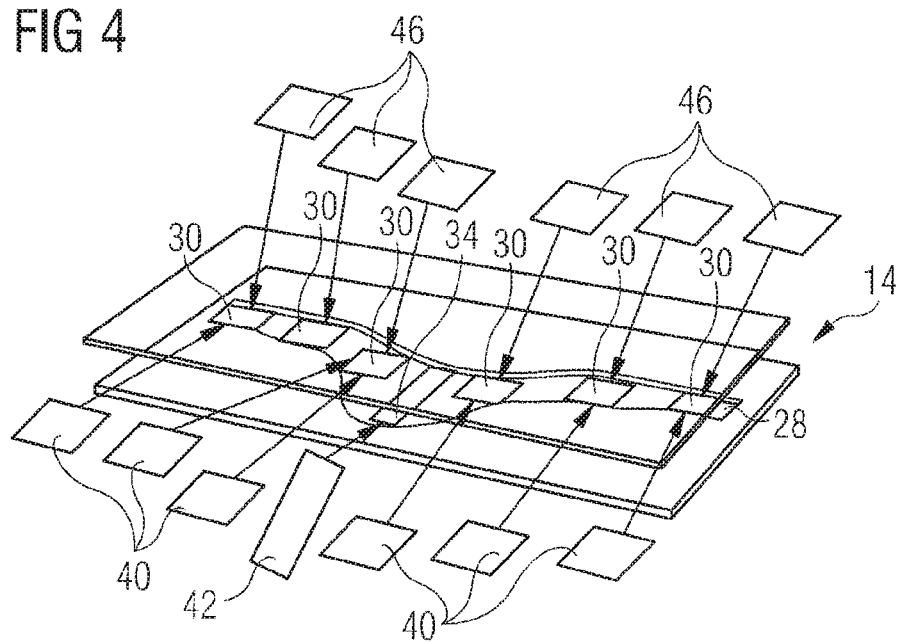
FIG. 4 shows an exploded representation of a worktop of the trolley compartment according to FIG. 2.
Figure 5:
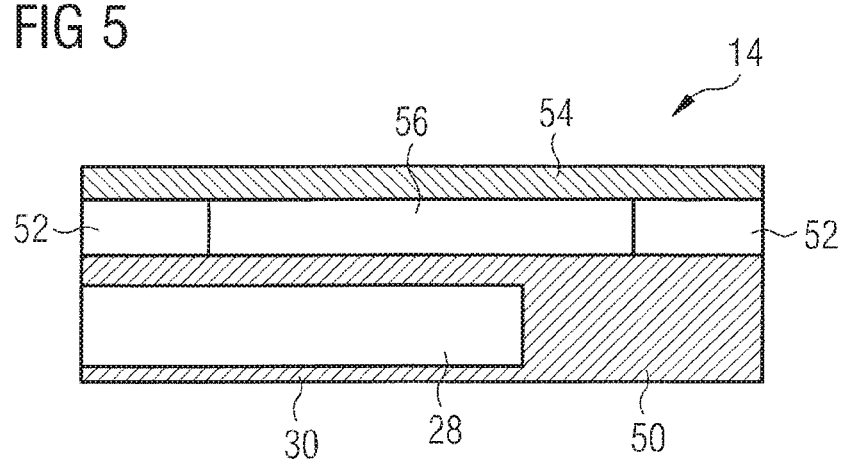
FIG. 5 shows a detail of the worktop according to FIG. 4, in a cross-sectional view.

As can best be seen in FIGS. 3 to 5, in the on-board kitchen 100 according to FIG. 1, a first cooling fluid duct 28 is integrated into the worktop 14. The first cooling fluid duct 28 can be connected, via a plurality of first cooling fluid apertures 30, to the interior space of the trolley compartment 10, the first cooling fluid apertures 30 being arranged in a manner distributed along a longitudinal axis L of the trolley compartment 10 that extends parallel to the frontal access aperture 16 and the rear wall 18 of the trolley compartment 10.

Figure 6:
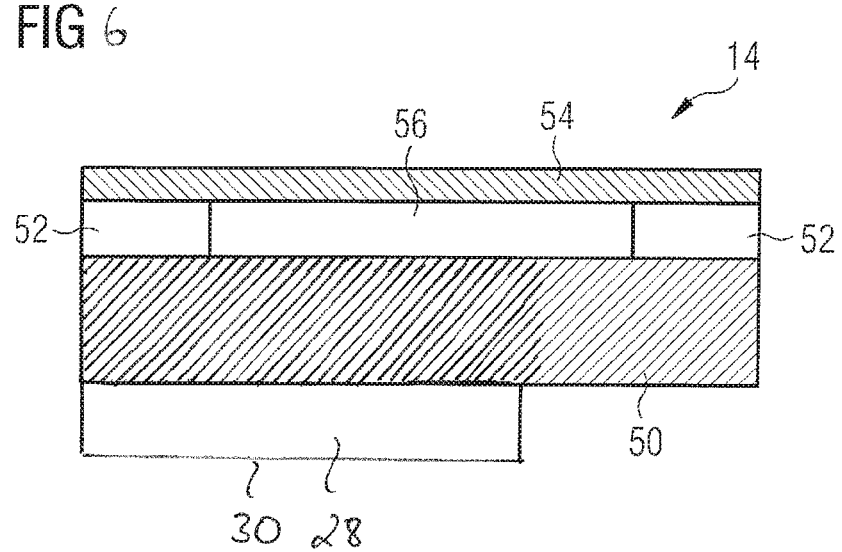
FIG. 6 shows a detail of an alternative worktop, in a cross-sectional view.

Alternatively, it is, however, also conceivable to equip the on-board kitchen 100 of FIG. 1 with a first cooling fluid duct 28 which is arranged adjacent to the worktop 14. Specifically, as shown in FIG. 6, the first cooling fluid duct 28 may be arranged below a lower surface of the worktop 14 which faces the interior space of the trolley compartment 10. Alternatively, as shown in FIG. 7, the first cooling fluid duct 28 may also be arranged above an upper surface of the worktop 14. In the configuration depicted in FIG. 7, the first cooling fluid duct 28 comprises a first portion 28a extending substantially parallel to the upper surface of the worktop 14 and a plurality of second portions 28b extending substantially perpendicular to the upper surface of the worktop 14 through the worktop 14. The second portions of the first cooling fluid duct 28 connect the first portion 28a of the first cooling fluid duct 28 to the plurality of first cooling fluid apertures 30.

A second cooling fluid duct 32 is integrated into the partition 24 of the trolley compartment 10 and can be connected, at its first end, to the first cooling fluid duct 28 via a connecting aperture 34 (see FIG. 2). At its second end, the second cooling fluid duct 32 is connected to the installation space 26 for a cooling device. Finally, there is integrated into the partition 24 of the trolley compartment 10 a third cooling fluid duct 36 which is connected, at its first end, to the installation space 26 for a cooling device. At its second end, the third cooling fluid duct 36 can be connected to the interior space of the trolley compartment 10 via two second cooling fluid apertures 38, one second cooling fluid aperture 38, in each case, opening into the first section, which is bounded by the first sidewall 20 and the partition 24, and into the second section, which is bounded by the partition 24 and the second sidewall 22, of the interior space of the trolley compartment 10.

The second and/or the third cooling fluid duct 32, 36 may be formed by a cavity which is present in the partition 24 of the trolley compartment 10. As an alternative to this, however, the second and/or the third cooling fluid duct 32, 36 may also be formed by separately constructed components which may, or may not, be incorporated in the cavities present in the partition 24 of the trolley compartment 10, that is to say, depending upon whether the trolley compartment 10 is to be cooled or not.

In an alternative embodiment of the trolley compartment 10 which is not illustrated in the figures, the installation space 26 for a cooling device may be so arranged that it permits positioning of the cooling device immediately underneath the worktop 14. The second cooling fluid duct 32 may then be formed by the connecting aperture 34 or an inner peripheral wall of the first connecting aperture 34 constructed in the worktop 14.

As a result of the integration of the first cooling fluid duct 28 into the worktop 14, as well as the integration of the second cooling fluid duct 32, the third cooling fluid duct 36 and the installation space 26 for a cooling device into the partition 24 of the trolley compartment 10, it is possible to dispense with the installation of internal fittings in the region of the rear wall 18 of the trolley compartment 10. The trolley compartment 10 thus has the same depth, i.e., the distance of the access aperture 16 from the rear wall 18 remains the same, irrespective of whether the trolley compartment 10 is to be constructed as a cooled trolley compartment 10 or as a non-cooled trolley compartment 10.

Moreover, the trolley compartment 10 can be easily converted from a cooled trolley compartment 10 to a non-cooled trolley compartment 10, and vice versa. For this purpose, the trolley compartment 10 comprises first removable cooling fluid aperture covers 40 which can selectively be mounted in the first cooling fluid duct 28 over the first cooling fluid apertures 30 in order to separate the first cooling fluid duct 28 from the interior space of the trolley compartment 10, or demounted from the first cooling fluid duct 28 in order to connect the first cooling fluid duct 28 to the interior space of the trolley compartment 10 via the first cooling fluid apertures 30. Also provided is a removable connecting aperture cover 42 which can selectively be mounted in the first cooling fluid duct 28 over the connecting aperture 34 in order to separate the first cooling fluid duct 28 from the second cooling fluid duct 32, or demounted from the first cooling fluid duct 28 in order to connect the first cooling fluid duct 28 to the second cooling fluid duct 32 via the connecting aperture 34. Finally, there are two second removable cooling fluid aperture covers 44 which can selectively be mounted in the third cooling fluid duct 36 over the two second cooling fluid apertures 38 in order to separate the third cooling fluid duct 36 from the interior space of the trolley compartment 10, or demounted from the third cooling fluid duct 36 in order to connect the third cooling fluid duct 36 to the interior space of the trolley compartment 10 via the second cooling fluid apertures 38. The first removable cooling fluid aperture covers 40, the connecting aperture cover 42 and the second removable cooling fluid aperture covers 44 are each constructed in the form of plates made of metal, plastic or the like.

If the trolley compartment 10 is to be constructed as a non-cooled trolley compartment 10 or converted from a cooled trolley compartment 10 to a non-cooled trolley compartment 10, the first removable cooling fluid aperture covers 40 are positioned in the first cooling fluid duct 28 over the first cooling fluid apertures 30 and the first cooling fluid duct 28 is thereby occluded in relation to the interior space of the trolley compartment 10. In a similar manner, the connecting aperture cover 42 is arranged in the first cooling fluid duct 28 over the connecting aperture 34, so that the first cooling fluid duct 28 is also occluded in relation to the second cooling fluid duct 32. In this way, the penetration of dirt into the first cooling fluid duct 28 is reliably prevented. Finally, the second removable cooling fluid aperture covers 44 are, in addition, arranged in the third cooling fluid duct 36 over the second cooling fluid apertures 38 in order to occlude the third cooling fluid duct 36 in relation to the interior space of the trolley compartment 10. By this means, the third cooling fluid duct 36 is also protected against the penetration of dirt from the interior space of the trolley compartment 10.

In a non-cooled trolley compartment 10, the installation of a cooling device in the installation space 26 is dispensed with. In the case of a conversion of a trolley compartment 10 from a cooled trolley compartment 10 to a non-cooled trolley compartment 10, a cooling device installed in the installation space 26 can be demounted for weight-saving reasons, but may also be left in the installation space 26 if desired.

If the trolley compartment 10 is to be constructed as a cooled trolley compartment 10, on the other hand, the mounting of the first removable cooling fluid aperture covers 40 and the connecting aperture cover 42 in the first cooling fluid duct 28, as well as the mounting of the second removable cooling fluid aperture covers 44 in the third cooling fluid duct 36, are dispensed with. In the case of a conversion of the trolley compartment 10 from a non-cooled trolley compartment 10 to a cooled trolley compartment 10, the first removable cooling fluid aperture covers 40 and the connecting aperture cover 42 are demounted from the first cooling fluid duct 28, and the second removable cooling fluid aperture covers 44 are demounted from the third cooling fluid duct 36.

Instead of this, first removable fluid-permeable, grille-type cooling fluid aperture covers 46 are positioned in the first cooling fluid duct 28 over the first cooling fluid apertures 30 (see FIG. 4). The second cooling fluid apertures 38 are covered by second removable fluid-permeable, grille-type cooling fluid aperture covers 48 which are positioned in the third cooling fluid duct 36 over the second cooling fluid apertures 38 (see FIG. 2). The first removable fluid-permeable, grille-type cooling fluid aperture covers 46 and the second removable fluid-permeable, grille-type cooling fluid aperture covers 48 permit the passage of cooling fluid, but hold back dirt, so that the first cooling fluid duct 28 and the third cooling fluid duct 36 are protected against the penetration of dirt from the interior space of the trolley compartment 10, even if the trolley compartment 10 is constructed as a cooled trolley compartment 10.

If the trolley compartment 10 shown in the figures is constructed as a cooled trolley compartment 10, the third cooling fluid duct 36 serves as a cooling fluid feed duct for feeding cooling fluid from a cooling fluid outlet of a cooling device installed in the installation space 26 into the interior space of the trolley compartment 10. The first cooling fluid duct 28, on the other hand, forms a section of a cooling fluid discharge duct for discharging cooling fluid, which has been warmed up on flowing through the trolley compartment 10, from the interior space of the trolley compartment 10. Cooling fluid passing out of the first cooling fluid duct 28 via the connecting aperture 34 is fed, via the second cooling fluid duct 32, to a cooling fluid inlet of the cooling device installed in the installation space 26. If desired, however, the direction of flow of the cooling fluid through the trolley compartment 10 can also be reversed, i.e., cooling fluid may be fed from a cooling fluid outlet of a cooling device installed in the installation space 26, via the second cooling fluid duct 32 and the first cooling fluid duct 28, into the interior space of the trolley compartment 10, and discharged from the interior space of the trolley compartment 10 via the third cooling fluid duct 36.

Finally, FIGS. 5 to 7 illustrate the fact that the worktop 14 is of multilayer makeup and comprises a first layer 50. The first layer 50 is separated by spacers 52 from a second layer 54. A table which can be pulled out (not shown in FIGS. 5 to 7) is arranged in a cavity formed by the spacers 52 between the first and second layers 50, 54. When the table is in its pulled-out position, it enlarges the working surface formed by the upper side of the worktop 14. In its inoperative position, on the other hand, it is integrated into the worktop 14 and requires no additional installation space. In the arrangement of FIG. 5, the first cooling fluid duct 28 is integrated into the first layer 50 of the worktop 14.

A second embodiment of an on-board kitchen 100 which is shown in FIG. 8 differs from the arrangement depicted in FIG. 1 only in that a free space 58 is defined between a lower edge 60 of the partition 24 and a floor 62 of the trolley compartment 10. In other words, the partition 24 does not extend all the way down to the floor 62 of the trolley compartment 10. Thus, cooling fluid may circulate between the two sections of the trolley compartment interior space which are separated from one another by the partition 24. Otherwise the structure and the function of the on-board kitchen 100 according to FIG. 8 correspond to the structure and the function of the on-board kitchen 100 shown in FIG. 1.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A trolley compartment for an on-board kitchen intended for installation in a means of transport, which trolley compartment comprises:
    a frontal access aperture, as well as a rear wall that lies opposite said access aperture;
    a worktop which forms an upper boundary of the trolley compartment;
    a first cooling fluid duct which is integrated into or arranged adjacent to the worktop and which is connectable to an interior space of the trolley compartment via at least one first cooling fluid aperture; and
    at least one first removable cooling fluid aperture cover which is selectively mountable in the first cooling fluid duct over the first cooling fluid aperture to seal said first cooling fluid duct from the interior space of the trolley compartment, and demountable from the first cooling fluid duct to connect said first cooling fluid duct to the interior space of the trolley compartment via the first cooling fluid aperture, wherein said at least one first removable cooling fluid aperture cover selectively seals and unblocks said first cooling fluid aperture.

2. The trolley compartment according to claim 1, further comprising a first removable fluid-permeable cooling fluid aperture cover which is selectively mountable in the first cooling fluid duct over the first cooling fluid aperture, or demountable from said first cooling fluid duct.

3. The trolley compartment according to claim 1, which further comprises a second cooling fluid duct connectable to the first cooling fluid duct via a connecting aperture provided in said first cooling fluid duct.

4. The trolley compartment according to claim 3, wherein the second cooling fluid duct is integrated into a sidewall or a partition of the trolley compartment.

5. The trolley compartment according to claim 3, which further comprises a removable connecting aperture cover selectively mountable in the first cooling fluid duct over the connecting aperture to separate said first cooling fluid duct from the second cooling fluid duct, or demountable from the first cooling fluid duct to connect said first cooling fluid duct to the second cooling fluid duct via the connecting aperture.

6. The trolley compartment according to claim 3, which further comprises an installation space for a cooling device, which installation space is connected to the second cooling fluid duct.

7. The trolley compartment according to claim 6, wherein the installation space for a cooling device is integrated into a sidewall or a partition of the trolley compartment.

8. The trolley compartment according to claim 6, which further comprises a third cooling fluid duct connected to the installation space for a cooling device and connectable to the interior space of the trolley compartment via a second cooling fluid aperture.

9. The trolley compartment according to claim 8, wherein said third cooling fluid duct is integrated into a sidewall or a partition of the trolley compartment.

10. The trolley compartment according to claim 8, wherein a free space is defined between a lower edge of the partition and a floor of the trolley compartment.

11. The trolley compartment according to claim 8, which further comprises a second removable cooling fluid aperture cover selectively mountable in the third cooling fluid duct over the second cooling fluid aperture to separate said third cooling fluid duct from the interior space of the trolley compartment, or demountable from the third cooling fluid duct to connect said third cooling fluid duct to the interior space of the trolley compartment via the second cooling fluid aperture.

12. The trolley compartment according to claim 8, which further comprises a second removable fluid-permeable cooling fluid aperture cover selectively mountable in the third cooling fluid duct over the second cooling fluid aperture, or demountable from said third cooling fluid duct.

13. The trolley compartment according to claim 1, wherein the worktop comprises a first layer as well as a second layer which is separated from the first layer by spacers.

14. The trolley compartment according to claim 13, wherein the first cooling fluid duct is integrated into the first layer of the worktop.

15. The trolley compartment according to claim 13, wherein a pull-out table is arranged in a cavity formed by the spacers between the first and second layers of the worktop.

16. The trolley compartment according to claim 1, which is provided with an insulating layer in the region of at least one of a rear wall and at least one sidewall.

17. An on-board kitchen for installation in a means of transport, which kitchen comprises a trolley compartment according to claim 1.

* * * * *